C. ALLEN.
FLOW NIPPLE.
APPLICATION FILED JUNE 11, 1921.

1 404,724.

Patented Jan. 31, 1922.

INVENTOR.
Chris Allen
BY Nestall and Wallace
ATTORNEYS.

UNITED STATES PATENT OFFICE.

CHRIS ALLEN, OF HUNTINGTON BEACH, CALIFORNIA.

FLOW NIPPLE.

1,404,724.  Specification of Letters Patent.  Patented Jan. 31, 1922.

Application filed June 11, 1921. Serial No. 476,876.

*To all whom it may concern:*

Be it known that I, CHRIS ALLEN, a citizen of the United States, and resident of Huntington Beach, in the county of Orange and State of California, have invented new and useful Improvements in a Flow Nipple, of which the following is a specification.

This invention relates to a nipple used to reduce the flow of oil from wells, and is especially adaptable for use with gushers.

It is the common practice to connect into the piping between the casing head of a gusher and the sump, a flow nipple to reduce the flow of oil from the well. This flow nipple consists of a section tubular in form and having a bore of relatively small diameter. The oil flowing from the well often carries sand, which wears the nipple and enlarges the bore in a very short time making the nipple unserviceable. It is then necessary to take down the pipe by unloosening the union and insert a new nipple in place. Such work requires time, several men to accomplish it and it may be dangerous. It is the primary object of my invention to provide a flow nipple of such construction that a new nipple may be inserted in place by one man and in a very short time. It is another object of my invention to provide a construction such that there is a small wastage of metal stock, and the renewable parts require a minimum of machining. It is a further object of my invention to provide details of construction whereby a simple, strong, and easily handled structure is obtained.

Figure 1:
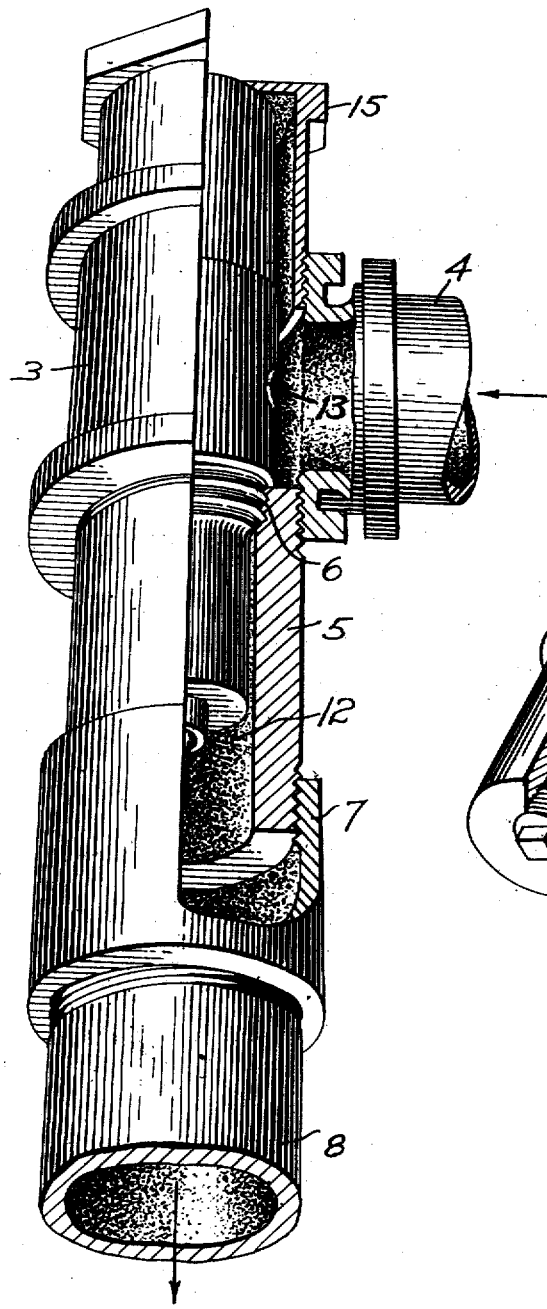
Figure 2:
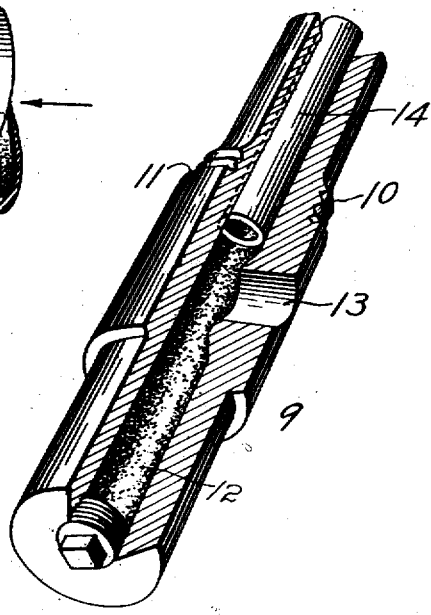

These objects together with other objects and corresponding accomplishments are obtained by means of the embodiment of my invention illustrated in the accompanying drawing, in which:

Fig. 1 is a perspective view of a flow nipple and associated fittings, parts being in section to better illustrate the construction; and Fig. 2 is a perspective view of the flow nipple shown partly in section.

Referring more particularly to the drawing, a T is indicated by 3. The middle leg of the T is connected by piping 4 leading to the casing head of the oil well, and the oil flows into the T as indicated by the arrow. Connected to another leg of the T on the sump side is a special external nipple 5 having a relatively thick wall and provided internally at one end with a fast thread 6. 7 indicates a union mounted on the nipple and connecting it to a section of pipe 8 leading to the sump.

Secured to the nipple 5 is a flow nipple consisting of a tubular member 9 having a threaded end 10 to engage the thread 6 in the external nipple and a shoulder 11 to limit the position of the flow nipple. Extending axially of the flow nipple is a bore 12 slightly tapered from the rear toward the front. A lateral port 13 communicates with the bore 12 and is disposed so that it may be in registry with the middle leg of the T. The rear end of the flow nipple extends beyond the opening in the T, hereafter called a replacement opening. Disposed in the bore 12 is a bushing 14 for the purpose of taking wear. This bushing is slightly tapered to conform to the taper of bore 12, and thereby fit snugly therein. Closing the rear leg of the T is a cup 15.

Assume that the flow nipple is assembled as shown in Fig. 1. Oil enters the T through the middle leg, passes into the port 13 and into the bore of the nipple passing out at the front end and through the piping to the sump. The wear occasioned by the sand will be taken care of by the bushing. When the bore of the bushing becomes too large, and it is desired to renew the nipple, cap 15 is removed. Next the flow nipple 9 is unscrewed from the nipple 5 and removed. This may be done with a Stillson wrench. The bushing 14 may then be knocked out of the flow nipple and a new one inserted, it being held in position wit in the flow nipple through its wedging engagement in tapered bore 12. The assembly of t e flow nipple is obvious. New bushings are easily inserted, and the time and labor required to remove the nipple and a bushing is a minimum.

What I claim is:

1. A flow nipple for oil wells comprising a housing having an inlet for oil and a reducing nipple detachably inserted in the outlet of said housing.

2. A flow nipple for oil wells comprising a housing having aligned openings, one an outlet for oil and the other a replacement opening, a reducing nipple detachably inserted in said outlet and extending through said replacement opening, and a cap closing said replacement opening, said housing having an inlet for oil.

3. A flow nipple for oil wells comprising a housing having an inlet for oil, a reducing nipple, detachably inserted in the outlet of said housing, said reducing nipple having a bore provided with a bushing.

4. A flow nipple for oil wells comprising a housing having aligned openings, one an outlet for oil and the other a replacement opening, a reducing nipple inserted in said outlet and extending through said replacement opening, and a cap closing said replacement opening, said nipple having a bore provided with a bushing.

5. A flow nipple for oil wells comprising a T fitting with aligned openings, one an outlet and the other a replacement opening and a middle opening, an external nipple inserted in one of said openings, a reducing nipple detachably inserted in said external nipple, said flow nipple extending through said replacement opening, and a cap closing the replacement opening.

6. A flow nipple having a tapering bore and a tapering bushing adapted to be removably wedged therein.

In witness that I claim the foregoing I have hereunto subscribed my name this 24th day of May, 1921.

CHRIS ALLEN.